Sept. 21, 1965    E. MUSCHELKNAUTZ    3,206,983
PROCESS AND APPARATUS FOR DETERMINING THE DISTRIBUTION
OF GRAIN SIZE IN POWDERS
Filed Aug. 31, 1962    2 Sheets-Sheet 2

INVENTOR.
Edgar Muschelknautz
BY
Burger, Dinklage & Sprung
ATTORNEYS though the distance between the nozzle 9 and the plate 8 is small, the pressure from the nozzle 9 is directly proportional to the force transferred from the air cushion to the plate 8 and therefore also to the weight difference to which the balance is subjected when the beams are adjusted independently. The distance should be less than ¼ of the diameter of the nozzle. The pressure may easily be measured with a ring balance 10 or some other measuring instrument as a measure of the variation in quantity $\Delta Q$ and may be recorded as a function of time $t$. At the end of the measurement, the variation in quantity $\Delta Q$ must be equal to the quantity of powder initially contained in the liquid layer corresponding to the difference in immersion height between the plates, which may easily be

United States Patent Office 3,206,983
Patented Sept. 21, 1965

3,206,983
PROCESS AND APPARATUS FOR DETERMINING THE DISTRIBUTION OF GRAIN SIZE IN POWDERS
Edgar Muschelknautz, Leverkusen, Germany, assignor to Farbenfabriken Bayer Aktiengesellschaft, Leverkusen, Germany, a corporation of Germany
Filed Aug. 31, 1962, Ser. No. 220,677
Claims priority, application Germany, Sept. 19, 1961, F 34,949
6 Claims. (Cl. 73—432)

The invention relates to a process and an apparatus for determining the distribution of grain size in powders, in which process and apparatus the concentration of particles dispersed in liquids is measured by means of drop pans arranged in sedimentation vessels.

It is already known that the quantity sedimented out of a liquid may be measured as a function of time by means of a drop pan suspended in a sedimentation vessel near the bottom. The quantity measured in each case is composed of a portion contributed by the quantity encountering the pan at any given moment and considered to be unchanged from the beginning of the measurement, and a second portion which includes all the particles which drop more rapidly than a particle which up to then has just dropped from the liquid level to the drop pan. The grain size is determined from the velocity of descent of this particle. The second portion of the quantity of powder measured is equal to the equivalent screen residue, i.e., that portion retained in a screen analysis at this grain size. The measured dependence of the sediment weight on the time must therefore be differentiated according to time, to obtain the residue curve, i.e. the percentage of particles larger than the indicated size, and differentiated twice to determine the distribution of frequency. This is complicated, and certain fine details in the grain structure are lost in the process. In addition, it is sometimes difficult accurately to determine the zero point of the curves recorded by the usual automatic apparatus, because the weight increase on the plate drop is greatest at the beginning of the measurement.

It is also known to measure the concentration of the powder in thin layers of sedimentation liquid at one or more predetermined levels of the sedimentation vessel as a function of time. The particles contained in a given liquid layer are smaller or slower than a particle having the velocity of descent and grain size calculated from the measuring time and height of drop. The concentrations measured therefore correspond to the equivalent screen throughput.

Various methods are known for determining the concentration. Small samples are taken from the suspension by means of a pipette, the liquid is evaporated and the solid is weighed, or alternatively the density of the dispersion is determined by the upthrust of the immersed bodies or by pressure measurements. The pipette method is complicated and time-consuming whereas with immersed bodies errors may occur due to deposition on the upper surface and compensating convention currents due to difference in concentration on the lower surface. Pressure measurements are extremely difficult owing to the slight pressure differences and are hardly used today.

It has now been found that these disadvantages may be overcome if, in accordance with the invention, the difference in weight of quantities sedimented out in a field of gravity or centrifugal field in two liquid columns of different height is determined.

The apparatus for carrying out the process consists of a beam balance with two drop pans at the ends of the beam acting as scale pans, one pan being more deeply immersed into a liquid column than the other. The balance thus measures as a difference the quantity by which the liquid layer, which corresponds to the difference in immersion depth between the two pans, is reduced during the sedimentation. Thus the change in concentration is measured, and with it the residue for the grain sizes determined from the height of drop and time required for dropping is measured directly. The difference in weight between the quantities sedimenting out produces on the balance a moment which may be measured, for example by means of a dynamometer, or compensated by the pressure of the air cushion of a baffle plate air nozzle. The pressure may be measured by means of a ring balance or some other pressure measuring instrument and registered as a function of time. The drawing illustrates diagrammatically two constructional examples of the invention.

Figure 1:
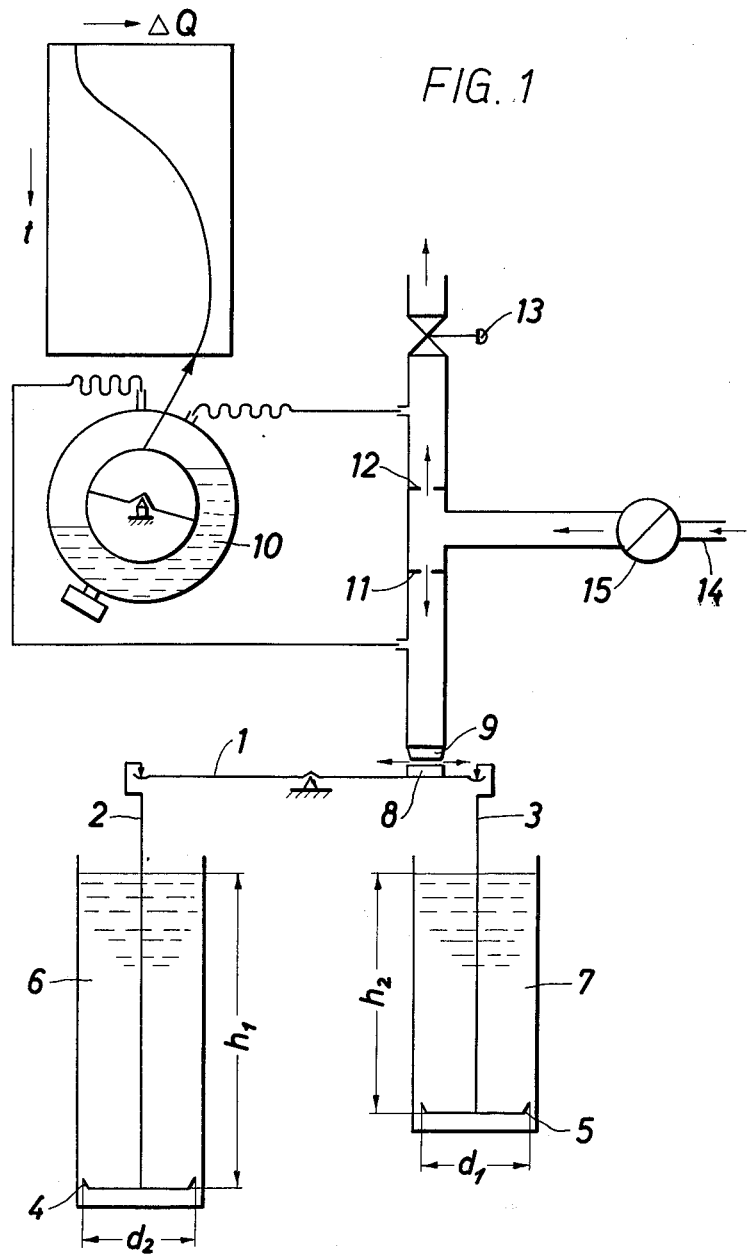
FIGURE 1 shows an apparatus for determining the concentration of powder sedimenting in the field of gravity.

FIGURE 1 shows a balance beam 1. At the ends of the beam, drop pans 4 and 5, which are immersed in liquid columns of the vessels 6 and 7, are suspended by rods 2 and 3. The pans 4 and 5 differ in their immersion depths $h1$ and $h2$, i.e. in the height of drop of the particles. The drop pan 5 measures the quantity of powder which drops into a liquid layer of a thickness equal to the difference in immersion between the pans 5 and 4. The pan 4 measures the quantity which drops out of this liquid layer.

To determine the grain size, an average height of drop must be assumed, which at the beginning of the measurement must lie exactly at half the height between the drop pans 4 and 5 and at the end of the measurement must lie at the level of the lower drop pan 4. It is preferably placed between these two pans. The error produced thereby in the calculation of the grain size is small. When the heights above the drop pans 5 and 4 are $h2=19$ and $h1=23$ cm., the maximum error is 2.5% and when $h2=19.5$ and $h1=21.5$ cm., the maximum error is 1.3% if the average height in both cases is taken to be 20 cm. It is preferable to use vessels and drop pans of identical size on a balance beam with equal arms and an equal initial concentration in both vessels. However, if desired, drop pans and vessels of different sizes may be used with equal balance arms, using correspondingly different initial concentrations, or unequal arms at equal concentrations. The measurement is simple and may be carried out by untrained assistants.

To carry out the process, the difference in weight to be determined by the balance 1 may be measured with the aid of an air cushion. The balance must for this purpose be adjusted independently. A small even plate 8 is placed on the beam 1, and a nozzle 9 is arranged at a slight distance above it. This nozzle supplies a constant air current during the whole measuring time. When the distance between the nozzle 9 and the plate 8 is small, determined from the initial concentration. It must be remembered, however, that the balance records the weight of powder as reduced by the upthrust of the liquid. The true weight is greater by the factor $\gamma_s/(\gamma_{Fl}-\gamma_s)$. $\gamma_{Fl}$ and $\gamma_s$ are the specific weights of the sedimentation liquid and of the powder respectively.

The constant air current is adjusted by a diaphragm 11 with a small aperture, in which the velocity of sound prevails. This does not vary with small variations in pressure at the nozzle. The quantity of air therefore remains constant provided that the pressure in front of the diaphragm is sufficiently high, as for example the pressure in a compressed air duct, and provided that this pressure and the temperature of the air remain constant.

When there is a narrow air gap, a considerable preliminary pressure is unavoidable even at rest, and this is compensated by counterweights on the balance beam.

It is advantageous to compensate this also on a ring balance 10 by an adjustable counterpressure on the second arm, this pressure being then kept constant. This may be achieved by means of a second air current maintained constant by a diaphragm 12 and flowing through a choke valve 13. By opening and closing the choke valve 13, the counterpressure may be easily and rapidly adjusted. The air required for the two air currents is supplied to the system through the duct 14 and is preferably taken from a main supply of compressed air. A reducing valve 15 compensates for variations in pressure of the compressed air.

Figure 2:
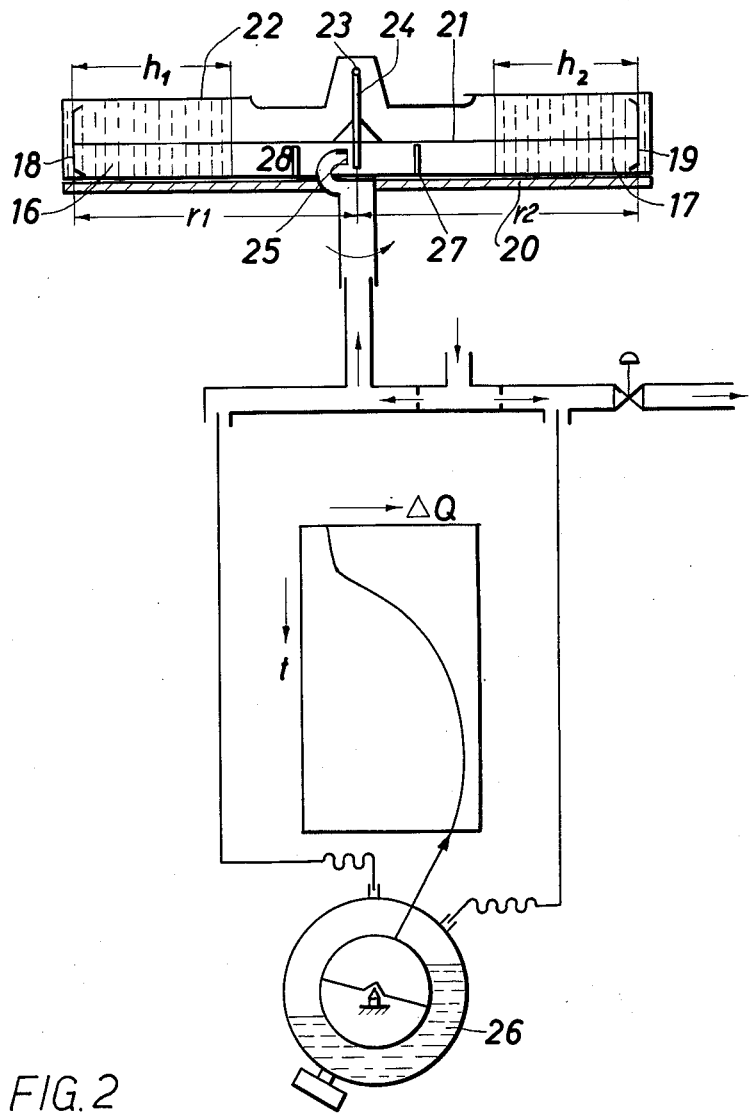
FIGURE 2 is an apparatus for use in a centrifugal field.

The principle of measurement may also advantageously be applied to a centrifugal field (see FIGURE 2). The vessels 16, 17 may be arranged with the pans 18, 19 directly on a horizontal rotary plate 20, and the two drop pans 18, 19 must be arranged at points of equal centrifugal acceleration, i.e., on equal radii $r1$ and $r2$ of the rotary plate 20. It is understood of course that the vessels may be arranged correspondingly with the pans directly on a vertical rotary plate, i.e., such that the pans will be rotated about a horizontal axis rather than a vertical axis as in the case of the embodiment illustrated in FIG. 2. Nevertheless, as shown in FIGURE 2, the two drop plates 18, 19 which are equal in size, are arranged on a common shaft 21 to lie opposite one another in a tube 22 on a horizontal rotary disc 20. The shaft 21 is rigidly fixed to a lever 24 movable about the pivot 23, and a nozzle 25 is arranged perpendicularly to this lever 24 at its lower end, at a slight distance therefrom. The measurements of the force are carried out by measuring the air pressure in the air cushion between the nozzle and the lever by means of a ring balance 26 or some other pressure measuring instrument as described with reference to FIGURE 1.

The different drop heights $h1$ and $h2$ are obtained by using different quantities of suspension, which may be filled into the containers while at rest through two gates 27 and 28. In calculating the grain sizes and residues, it is necessary to take into account the centrifugal acceleration, which may vary over the radius of the rotary plate. When this acceleration is about 10 times greater than the acceleration due to gravity, the influence of gravity may be neglected.

I claim:

1. Apparatus for determining the distribution of grain size in powders by comparison of changes in concentration as a function of time of particles dispersed in two separate liquid columns of unequal height in terms of weight differences in solids sedimented from such two columns, which comprises separate liquid column container means for containing two separate sedimentation liquid columns of unequal height, a balance means including a balance beam pivotable about a pivot point and having a pair of separate weighing pans, one of said pans being connected to said beam on one side of said pivot point and situated for displacement of said one pan in one of said column container means and in turn pivotal movement of said beam, and the other of said pans being connected to said beam on the other side of said pivot point and situated for corresponding displacement in the other of said column container means and in turn corresponding pivotal movement of said beam, the height of the liquid above said one pan in said one liquid column being different from the height of the liquid above said other pan in said other liquid column, means defining a baffle surface on said beam in a plane substantially radial to said pivot point, means defining a compressed air supply nozzle mounted directly before said baffle surface in facing relation thereto and fixed from pivotal movement with said beam to provide an air cushion gap between said surface and nozzle such that the normal predetermined distance apart of said surface and nozzle at said gap is less than one-fourth of the flow diameter of said nozzle, and pressure change sensing and recording means operatively coupled with said nozzle to sense and record as a function of time changes in pressure at said air cushion gap as said beam pivots and in turn said surface is displaced with respect to said nozzle under the influence of comparative changes in the weight of said pans caused by the weight difference of the masses of particles sedimenting upon the separate weighing pans as a function of time.

2. Apparatus according to claim 1 wherein said balance means includes a normally horizontal balance beam having a pivot point intermediate the end portions of said beam, one of said pans being suspended from one end portion of said beam and the other of said pans being suspended from the other end portion of said beam, said container means including two separate vertically positioned tubular containers respectively receiving said pans vertically displaceably therein, said pans being disposed in said containers at a normally uneven depth when said beam is normally horizontal.

3. Apparatus according to claim 1 wherein said container means, said balance means, said baffle surface and said nozzle are mounted for simultaneous centrifugal rotation, said container means including an elongated tube having two separate opposing tubular radial vessels at the end portions thereof situated on opposite sides of the centrifugal axis, said beam being suspended from a pivot point on said tube intersecting said centrifugal axis such that said beam normally coincides with said centrifugal axis, said pans being radially opposingly connected at a common axial point to said beam and being received respectively in said radial vessels at points of equal centrifugal acceleration such that the height of the liquid above said pans in said vessels is different when measured radially during rotation, said baffle surface being defined by an axial portion of said beam spaced from said common axial point, and said nozzle being directed radially toward said baffle surface at an axial level spaced from said pivot point.

4. Apparatus for determining the distribution of grain size in powders by comparison of changes in concentration as a function of time of particles dispersed in two separate liquid columns of unequal height in terms of weight differences in solids sedimented from such two columns, which comprises two separate vertical tubular containers having sedimentation liquid columns therein, said columns both having the same type liquid and dispersed particles, a weighing balance including a normally horizontal balance beam pivotable about a pivot point and having a pair of separate weighing pans, one of said pans being suspended vertically from said beam on one side of said pivot point and situated vertically displaceably in one of said containers and the other of said pans being suspended vertically from said beam on the other side of said pivot point and situated vertically displaceably in the other of said containers, said one pan being immersed to a greater depth in the sedimentation liquid column in said one container than that of the other said pan in the liquid column in said other container, a baffle plate on one end portion of said beam in a plane substantially radial to said pivot point, a stationary compressed air supply nozzle mounted directly before asid baffle plate in facing relation thereto to provide an air cushion gap between said plate and nozzle such that the normal predetermined distance apart of said plate and nozzle at said gap is less than one-fourth of the flow diameter of said nozzle, and pressure change sensing and recording means including ring balance means operatively coupled with said nozzle to sense and record as a function of time changes in pressure at said air cushion gap as said beam pivots and in turn said plate is displaced with respect to said nozzle under the influence of comparative changes in the weight of said pans caused by the weight difference of the masses of particles sedimenting as a function of time upon the separate weighing pans from the corresponding liquid columns into which said pans are immersed to uneven depths.

5. Apparatus for determining the distribution of grain size in powders by comparison of changes in concentration as a function of time of particles dispersed in two separate liquid columns of unequal height in terms of weight differences in solids sedimented from such two columns, which comprises an elongated tube having opposing separate tubular radial vessels at the opposing end portions thereof, said tube being mounted on a rotatable support for centrifugal rotation with said support, the radial vessels of said tube being arranged on said support on opposite sides of the centrifugal axis thereof and containing separate sedimentation liquid columns respectively therein having the same type liquid and dispersed particles, a weighing balance means including a balance beam pivotally suspended from a pivot point on said tube intersecting said centrifugal axis such that said beam normally coincides with said centrifugal axis and rotates with said tube, a pair of separate weighing pans radially opposingly connected to said beam at a common axial point spaced from said pivot point and received respectively in said radial vessels at points of equal centrifugal acceleration for rotation with said tube and for corresponding radial displacement within said vessels with respect to the centrifugal axis and in turn pivotal movement of said beam out of its normal position, the amount of liquid in said vessels and the normal position of said pans being such that one of said pans is immersed to a greater depth in the sedimentation liquid column of its corresponding vessel during centrifugal rotation than the immersion depth of the other pan in its corresponding vessel, a baffle surface defined by an axial portion of said beam in a plane substantially radial to said pivot point and spaced from said common axial point, a compressed air supply nozzle mounted on said support for rotation therewith yet fixed from pivotal movement with said beam and situated directly before said baffle surface in facing relation thereto to provide an air cushion gap between said surface and nozzle such that the normal predetermined distance apart of said surface and nozzle at said gap is less than one-fourth of the flow diameter of said nozzle, and a pressure change sensing and recording means including ring balance means operatively coupled with said nozzle to sense and record as a function of time changes in pressure at said air cushion gap as said beam pivots and in turn said surface is displaced with respect to said nozzle under the influence of comparative changes in the weight of said pans caused by the weight difference of the masses of particles sedimenting as a function of time upon the separate weighing pans from the corresponding liquid columns into which said pans are immersed to uneven depths during centrifugal rotation.

6. Method for determining the distribution of grain size in powders by comparison of changes in concentration as a function of time of particles of such powders dispersed in liquids which comprises substantially simultaneously establishing two separate liquid columns of proportional cross-sectional area of the same sedimentation liquid, each with a predetermined initial concentration of dispersed particles of the powder whose grain size distribution is to be determined, collecting as a function of time separately within one of said liquid columns at a first predetermined level therein dispersed particles which sediment from the corresponding one column liquid and collecting as a function of time separately within the other of said liquid columns at a second predetermined level therein different from said first level dispersed particles which sediment from the corresponding other column liquid, both collecting steps being carried out simultaneously starting with said predetermined initial dispersed particle concentration in each column, and simultaneously weighing in situ as a function of time the collected particles in each of said columns to obtain a weight difference between the particles collected up to that point in time in said one column at said first level and in said other column at said second level, which weight difference directly and inherently represents the weight of those particles sedimenting from that liquid portion representing the difference in height of the two collection levels during the sedimenting and collecting and in turn their average grain size distribution as compared with that of the particles sedimenting from the liquid portion represented by that liquid column of said two liquid columns which has a lesser height from the top surface of the liquid to the collecting level thereof during the sedimenting and collecting.

References Cited by the Examiner

Sullivan, W. F. and Jacobsen, A. E.: Sedimentation Procedures for Determining Particle Size Distribution, Symposium on Particle Size Measurement, ASTM Special Tech. Pub. No. 234, 1958, pp. 98–116.

RICHARD C. QUEISSER, *Primary Examiner.*